(12) United States Patent
Kraiem et al.

(10) Patent No.: US 7,580,711 B1
(45) Date of Patent: Aug. 25, 2009

(54) CALIBRATION PROCEDURE FOR WIRELESS NETWORKS WITH DIRECT MODE TRAFFIC

(75) Inventors: Besma Kraiem, Fellbach (DE); Janos Enderlein, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 235 days.

(21) Appl. No.: 09/598,984

(22) Filed: Jun. 21, 2000

(30) Foreign Application Priority Data

Jun. 23, 1999  (EP) ................................ 99112129

(51) Int. Cl.
*H04W 40/00* (2009.01)
(52) U.S. Cl. ................... 455/446; 455/518; 455/416; 455/83; 455/423
(58) Field of Classification Search ................ 455/446, 455/67.1, 67.3, 63, 423, 13.1, 433, 436, 449, 455/63.1, 518, 416, 83.1, 466
See application file for complete search history.

(56) References Cited

U.S. PATENT DOCUMENTS

| | | | | |
|---|---|---|---|---|
| 5,003,619 A | * | 3/1991 | Morris et al. | 455/69 |
| 5,568,399 A | * | 10/1996 | Sumic | 700/293 |
| 6,115,580 A | * | 9/2000 | Chuprun et al. | 455/1 |
| 6,236,854 B1 | * | 5/2001 | Bradshaw, Jr. | 455/416 |
| 6,321,068 B1 | * | 11/2001 | Zamat | 455/69 |

* cited by examiner

*Primary Examiner*—Nghi H Ly
(74) *Attorney, Agent, or Firm*—Oblon, Spivak, McClelland, Maier & Neustadt, P.C.

(57) ABSTRACT

A calibration procedure of wireless networks to create a topology map mainly consists of two phases: a measurement phase during which each wireless device, i.e. all mobile terminals end the central controller, transmits a calibration signal in broadcast mode (S2, S3, S4) and each other wireless device measures the received signal quality and the reporting phase during which each mobile terminal reports the measured results to the central controller of the network (S6, S7). Both of these phases are preferably initiated by the central controller, the measurement phase with the broadcast of a measurement control signal to all mobile terminals (S1) and the reporting phase with the broadcast of a reporting control signal to all mobile terminals (S5). Based on all measurement results the central controller creates a topology map of the network once all reports have been received. This topology map is updated in two cases, namely when a new device joins the network with a high priority calibration and when a timer expires with a low priority calibration, i.e. only when there are enough free resources.

30 Claims, 3 Drawing Sheets

CALIBRATION PROCEDURE FOR WIRELESS NETWORKS WITH DIRECT MODE TRAFFIC

The present invention relates to the calibration procedure for wireless networks with direct mode traffic, and in particular to the creation of a topology map indicating the quality of connectivity of each wireless device of a wireless network with all other wireless devices in said wireless network.

Figure 3:
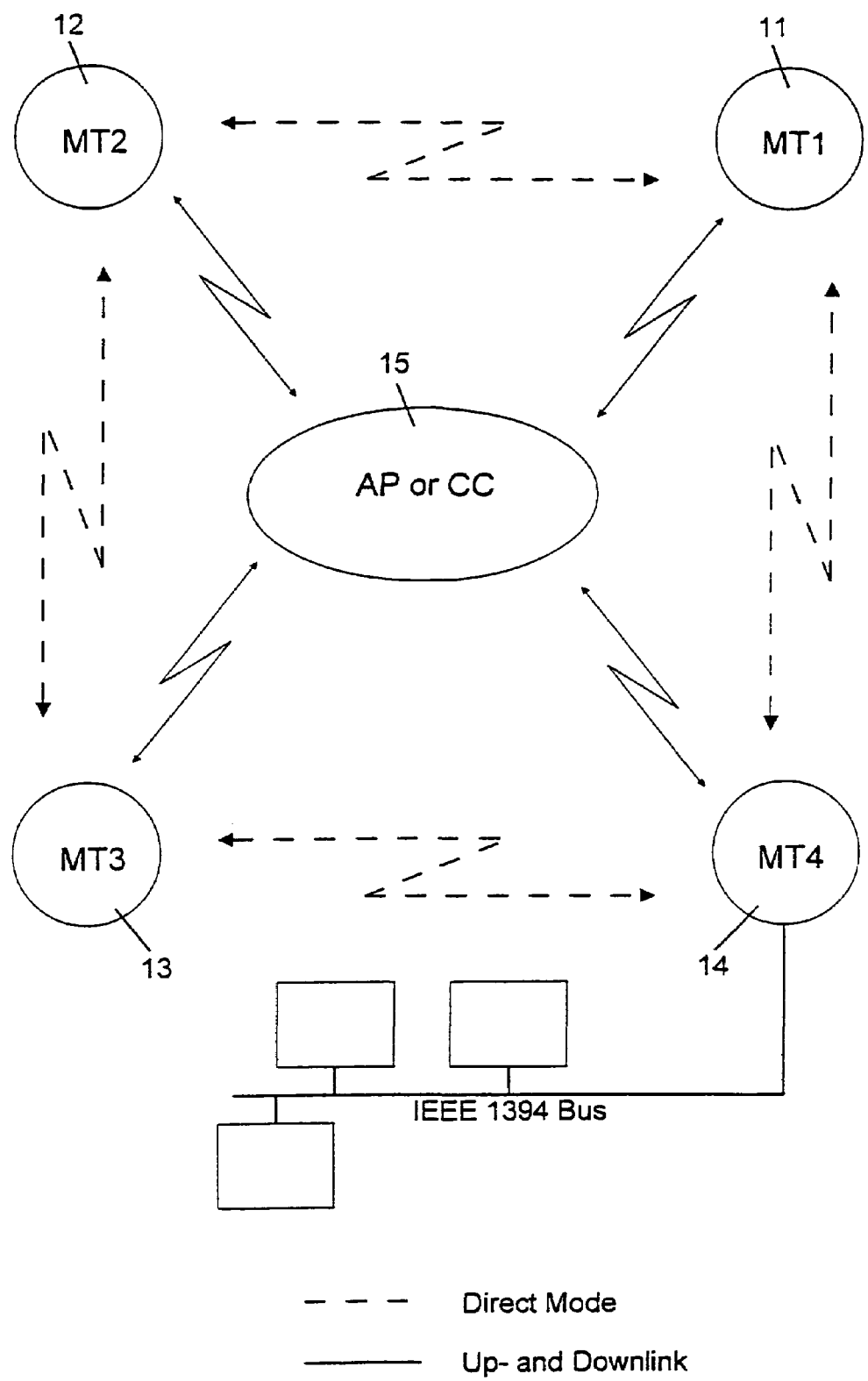

A typical wireless network, such as the IEEE 1394 based HIPERLAN type 2 broadband radio access network which specification is developed by ETSI is shown in FIG. 3. An access point or central controller 15 has an up- and down-link communication with several mobile terminals 11, 12, 13, and 14 and the mobile terminals can also have a direct communication in-between each other so that apart from the granting of resources for peer mobile terminals, e.g. the first mobile terminal 11 and the second mobile terminal 12, the access point or central controller 15 is not involved in the communication. Such direct communications in-between two or more mobile terminals are called direct mode. An IEEE 1394 bus with connected network devices is exemplary shown only for the fourth mobile terminal 14.

The problem in wireless networks including direct mode traffic is that the mobile terminals do not know with which other devices they have radio link. Thus, they intend to request the central controller 15 to set up certain connections even though they are not possible. A second problem is the transmit power control during direct mode traffic. Without knowledge about the radio link quality always maximum transmit power levels have to be used until appropriate levels are identified.

Therefore, a topology map has been introduced indicating the quality of connectivity of each network device of a wireless network with all other network devices in said wireless network. After distribution of this topology map, a mobile terminal can check whether a connection is possible or not before requesting it with the central controller. Furtheron, transmit power control can be performed using an initial power level determined on the quality of connectivity of the particular radio link.

Also, in case the topology map of the wireless network is not distributed in the whole network, but only stored within the central controller enables the central controller to accept or reject connection requests between two wireless devices depending on the radio link quality. Furthermore, once the topology map has been created, the central controller can inform the peer wireless devices to set up their transmit power levels accordingly until accurate transmit power control is performed.

Therefore, it is the object of the present invention to provide a method to create a topology map indicating the quality of connectivity of each network device of a wireless network with all other network devices in said wireless network. Furtheron, it is the object of the present invention to provide network devices that are adapted to work according to the inventive method.

These objects are solved by the inventive method to create a topology map according to independent claim 1 and network devices for a wireless network according to independent claims 13 and 18. Preferred embodiments thereof are respectively defined in the respective dependent claims.

A method to create a topology map indicating the quality of connectivity of each network device of a wireless network with all other network devices in said wireless network according to the present invention comprises the following steps: performing a measurement phase in which a calibration signal is successively broadcasted by each network device and in which all respective other network devices receiving said calibration signal measure the received signal quality: performing a reporting phase in which the measurement results are transmitted from each network device to the network device creating said topology map: and performing a creating phase in which said topology map of the network is created within the network device creating said topology-map on basis of all received measurement results.

Therefore, according to the present invention a very quick creation of the topology map is possible, since no bandwidth is wasted transmitting small amounts of data, namely single measurement results, from the network devices that have measured the received signal quality of one control signal to the network device creating said topology map, but since first all measurement results are collected before they are transmitted to the network device creating the topology map.

Preferably said measurement phase and/or said reporting phase are initiated by the network device creating the topology map.

Further, preferably the topology map is updated when a new network device joins the network and/or after a predetermined amount of time has lapsed.

A first type of network device for a wireless network according to the present invention is characterized by means to broadcast a calibration signal, to measure a power level of a received calibration signal, and to transmit its measurement results to another network device or to store it internally.

Preferably these functions are carried out on demand of another network device, but they can also be carried out on an internal demand. Therefore, the network device according to the present invention preferably comprises a decoder that initiates the broadcast of a control signal and the measurement of the reception quality of one or more incoming broadcast signals upon reception of a measurement control signal and that further preferably initiates the trans-mission of one or more measurement results upon reception of a reporting control signal.

Preferably the network device according to the present invention is characterized by a report encoder that receives one or more signal quality indication signals and encodes therefrom a signal quality control signal to be transmitted to said other network device or to be stored internally.

A second type of network device according to the present invention is characterized by means to initiate a measurement phase, to initiate a reporting phase, and to perform a creation of a topology map on basis of measurement results received during the reporting phase.

This second type of network device preferably includes all features of the first type of network device according to the present invention.

The first type of network device according to the present invention is either a mobile terminal or a mobile terminal having the functionality of a central controller, whereas the second type of network device according to the present invention always has the functionality of a central controller.

Figure 1:
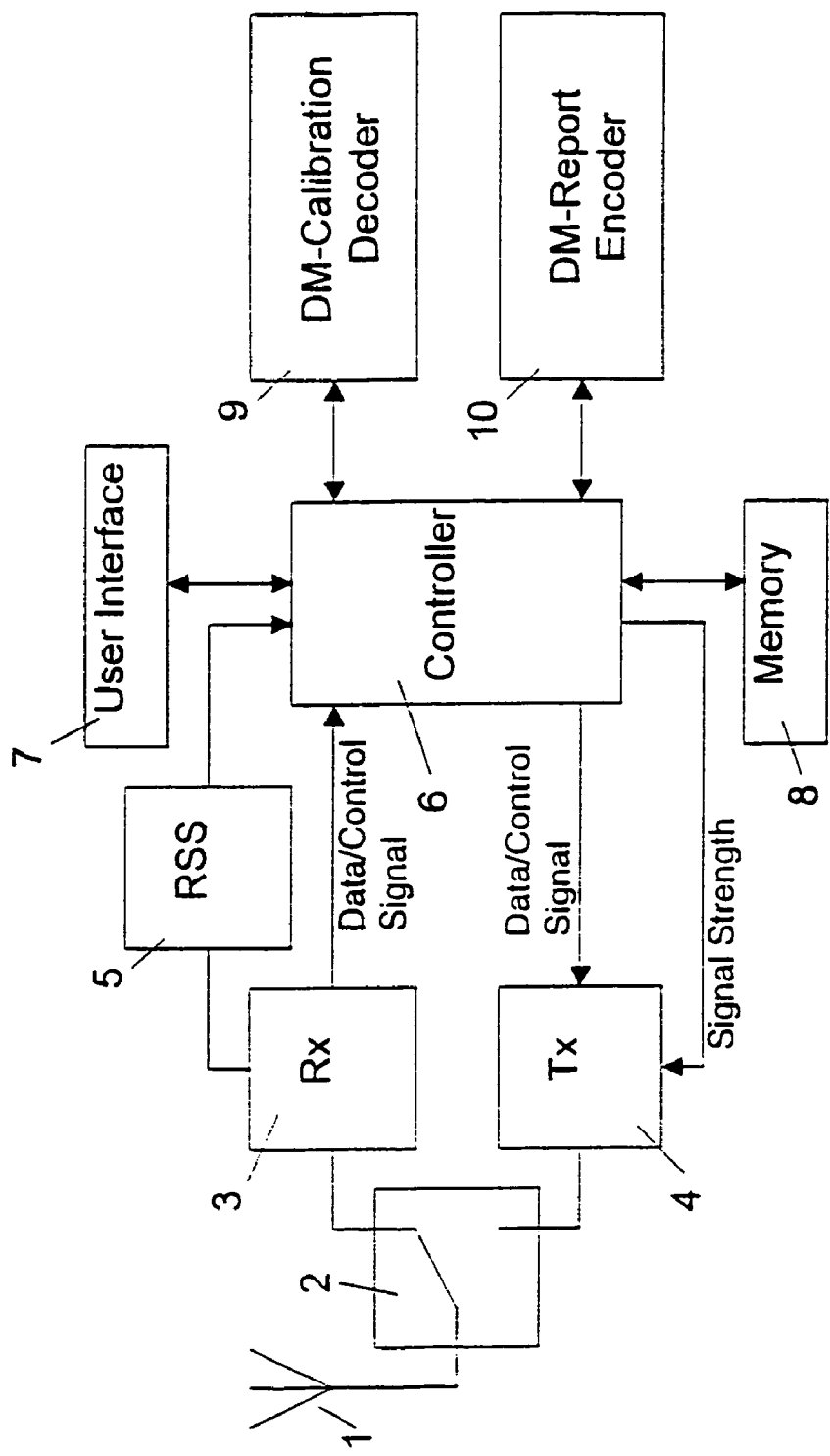
Figure 2:
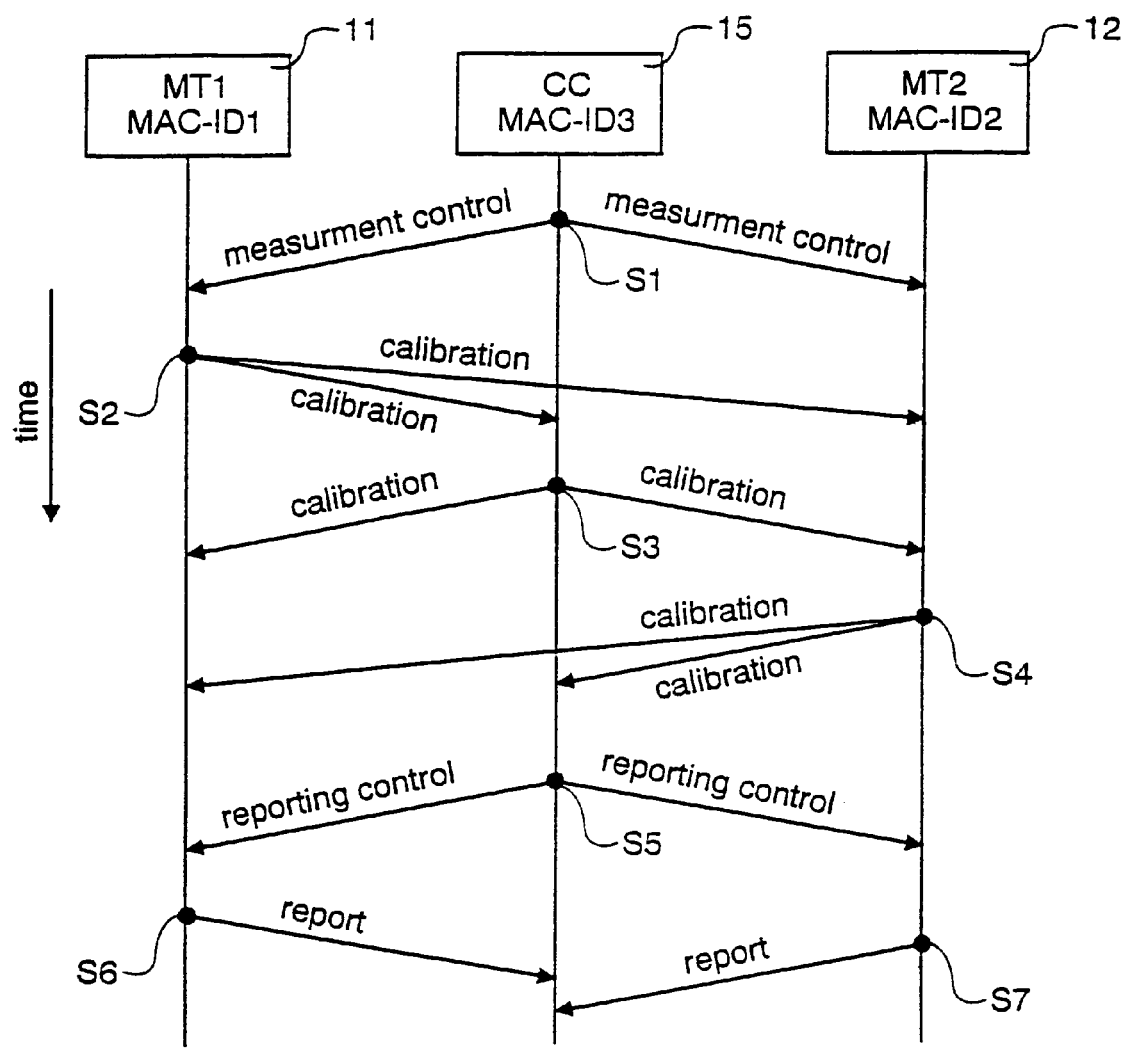

The present invention and its numerous embodiments will be better understood on basis of the following exemplary description thereof taken in conjunction with the accompanying drawings, in which FIG. 1 shows a network device according to the present invention:

FIG. 2 shows the messaging in-between the central controller and two mobile terminals during the calibration procedure to create the topology map; and FIG. 3 shows an exemplary wireless network.

The mobile terminal shown in FIG. 1 is adapted to perform a direct mode calibration according to the present invention. The shown mobile terminal has one antenna 1 which is connected to the movable terminal of a transmit/receive selection switch 2 which fixed terminals are respectively connected to the transmitter and receiver signal path of the mobile terminal. In the receiver signal path a receiver 3 is directly connected to the respective fixed terminal of the transmit/receive selection switch 2. This receiver 3 produces a data and control signal input to a controller 6 and also outputs a signal wherefrom a signal quality measurement unit 5 can determine the received signal strength which is output to the controller 6. For the transmitter signal path the controller 6 outputs a data and control signal to a transmitter 4 which modulates, up-converts and amplifies this signal to a given signal strength which is indicated to the transmitter 4 by a control signal generated by the controller 6 and outputs the generated transmission signal to the respective fixed terminal of the transmit/receive selection switch 2. Bi-directionally connected to the controller are a user interface 7 and a memory 8. Furtheron, the controller 6 is connected to a direct mode calibration decoder 9 and a direct mode report encoder 10.

The direct mode calibration decoder 9 receives the control signals generated by the receiver 3 via the controller 6 and initiates the broadcast of a calibration signal and the measurement of the reception quality of one or more incoming broadcasted calibration signals from other mobile terminals upon reception of a measurement control signal which is transmitted from the central controller 15. Furtheron, upon reception of a reporting control signal which is also transmitted from the central controller 15 the direct mode calibration decoder 9 initiates the transmission of one or more measurement results to said central controller 15. Therefore, all measurement results stored within the memory 8 are communicated to the direct mode report encoder 10 by the controller 6 and said direct mode report encoder 10 generates a signal quality control signal that is transmitted via the controller 6 and the transmitter 4 to the central controller 15. The central controller 15 creates a topology map on basis of all measurement results received from all mobile terminals during the reporting phase.

In the following the calibration procedure will be described in connection with FIG. 2 which shows the messaging in-between the central controller 15 having a medium access control identifier, i.e. MAC-ID3, and a first mobile terminal 11 having a MAC-ID1 and a second mobile terminal 12 having a MAC-ID2, after the calibration procedure is decided to be started, since either a new mobile terminal joins the network or a timer has expired.

In a first step S1 the central controller 15 send measurement control signals to both mobile terminals 11 and 12. Of course, the central controller 15 itself knows that the measurement phase of the calibration procedure will be performed. Therefore, after the first step S1 all three network devices, namely the central controller 15 and the first and second mobile terminals 11 and 12, are initialized to perform the measurement phase. During the measurement phase all network devices within the wireless network successively broadcast a calibration signal and receive the calibration signals transmitted by the other network devices to determine their respective signal quality. Therefore, in a step S2 the first mobile terminal 11 broadcasts its calibration signal to the central controller 15 and the second mobile terminal 12 which receive said calibration signal, measure its signal quality, and store it in an internal memory.

Thereafter, the central controller 15 itself performs the broadcast of a calibration signal to the first and second mobile terminals 11 and 12 in a step S3. Both mobile terminals 11 and 12 respectively receive the calibration signal, measure its signal quality and store this value in an internal memory. Following in a step S4 the second mobile terminal 12 also broadcasts a calibration signal to the first mobile terminal 11 and the central controller 15 which respectively receive this calibration signal, measure its signal quality and store this measured value in an internal memory. After all mobile terminals have broadcasted their calibration signals and these calibration signals are received and measured by all respective other devices, the central controller 15 transmits a reporting control signal in a step S5 to the first mobile terminal 11 and the second mobile terminal 12. After reception of the reporting control signal, both mobile terminals generate a signal quality control signal comprising one or more measurement results and transmit it respectively to the central controller 15. The first mobile terminal 11 transmits its signal quality control signal in a step S6 to the central controller 15 and the second mobile terminal 12 transmits its signal quality control signal to the central controller 15 in a step S7.

Of course, the central controller 15 knows its own measurement results, since they are already stored in its internal memory. Upon reception of all measurement results from all other mobile terminals within the network, the central controller 15 generates the topology map which indicates the reception quality for every radio link available within the network.

To summarize the above procedure it can be said that the calibration procedure mainly consists of two phases, namely the measurement phase and the reporting phase. In an exemplary embodiment of an IEEE 1394 based HIPERLAN type 2 network during the measurement phase the calibration slot is transmitted using a dedicated control channel. It contains the source identifier. The calibration slot is transmitted using the maximum allowed transmit power level in order to avoid artificial hidden nodes. Each other wireless device measures the received quality, e.g. by means of the received signal strength and stores it in an internal memory. During the reporting phase each wireless device reports its measurement results to the central controller using a dedicated control channel. The report slot contains the identifier of the wireless device and the report measurements. One or more measurement results can be transmitted in one report slot.

Once all wireless devices have reported their measurement results to the central controller, the central controller (in a third phase) creates a topology map of the network which indicates the quality of connectivity of each wireless device with all others. A possible topology map of a network with n active devis represented into a matrix is shown below:

|         | MAC-ID1 | MAC-ID2 | MAC-ID3 | ... | ... | ... | MAC-IDn |
|---------|---------|---------|---------|-----|-----|-----|---------|
| MAC-ID1 |         | RSS 1-2 | RSS 1-3 | ... | ... | ... | RSS 1-n |
| MAC-ID2 | RSS 2-1 |         | RSS 2-3 | ... | ... | ... | RSS 2-n |
| MAC-ID3 | RSS 3-1 |         |         | ... | ... | ... | RSS3 1-n |
| ...     | ...     | ...     | ...     | ... | ... | ... | ...     |
| ...     | ...     | ...     | ...     | ... | ... | ... | ...     |
| ...     | ...     | ...     | ...     | ... | ... | ... | ...     |
| MAC-IDn | RSS n-1 | RSS n-2 | RSS n-3 | ... | ... | ... |         |

RSS n-m represents the received signal strength at mobile terminal n when transmitted by mobile terminal m. The central controller is also regarded as mobile terminal, since in a wireless network environment with mobile terminals the task of the central controller might be switched from one mobile terminal to another. According to the example shown hereinafter 4 bits are used to map the received signal quality, i.e. the received power to a signal strength code. Therefore, there exist sixteen possibilities of designated received power levels to be included in the topology map. According to the shown example, a bandwidth of <−90 dBm to >−30 dBm is set with a step size of 3 dB and a range of −69 dBm to −48 dBm as a medium range mapped to one coding value.

| RSS2 | Received Power at ARP [dBm] | Step Size |
|---|---|---|
| 0000 | <−90 dBm (no radio link) | 3 dB |
| 0001 | −90 | |
| 0010 | −87 | |
| 0011 | −84 | |
| 0100 | −81 | |
| 0101 | −78 | |
| 0110 | −75 | |
| 0111 | −72 | |
| 1000 | −69 . . . −48 | 21 dB |
| 1001 | −45 | 3 dB |
| 1010 | −42 | |
| 1011 | −39 | |
| 1100 | −36 | |
| 1101 | −33 | |
| 1110 | −30 | |
| 1111 | >−30 dBm | |

Of course, any other mapping e.g. in a strictly linear or non-linear fashion can be performed as well.

An update of the topology map is always triggered by the central controller. It is started as a high priority calibration when a new mobile terminal joins the network so that an updated topology map is nearly immediately created, e.g. within 2 ms. Furtheron, a low priority calibration is started every time when a timer expires, e.g. every 100 ms. Low priority in this sense means that the calibration is carried out every time free resources are available.

The topology map of the network might be broadcast by the central controller to all mobile terminals and depending on the used system it might be transmitted as a whole or line by line. A mobile terminal receiving the topology map preferably stores this topology map together with a time stamp. Another possibility to give knowledge about the network topology to a mobile terminal is to just transmit a particular line or value of the topology map to the corresponding network device.

Of course, the present invention is not only to be used with an IEEE 1394 based HIPERLAN type 2 network, but with any wireless network, preferably with such supporting direct mode.

The invention claimed is:

1. A method to create a topology map of a wireless network, wherein said wireless network includes a plurality of network devices, wherein said network devices include mobile network devices provided for direct wireless communication in-between each mobile network device, and wherein said topology map indicating the quality of connectivity of each of said plurality of network devices with all other network devices of said plurality of network devices, comprising:
   performing a measurement phase in which a calibration signal is successively broadcasted by each network device and in which all respective other network devices receiving said calibration signal directly from a broadcasting network device measure the received signal quality;
   performing a reporting phase in which a reporting control signal is broadcasted by a network device creating said topology map to each other network device and in which the measurement results are directly wirelessly transmitted from each other network device receiving said reporting control signal to the network device creating said topology map;
   performing a creating phase in which said topology map of the network is created within the network device creating said topology map solely on a basis of all received measurement results; and
   performing a transmission phase in which said network device creating said topology map transmits at least part of said topology map to the other network devices.

2. The method according to claim 1, wherein said calibration signal is transmitted in a dedicated control channel.

3. The method according to claim 1, wherein said measurement results are reported in a respective dedicated control channel.

4. The method according to claim 1, wherein said calibration signal is transmitted with the maximum allowed transmit power level.

5. The method according to claim 1, wherein said topology map is updated when a new network device joins the network.

6. The method according to claim 1, wherein said topology map is updated after a predetermined amount of time.

7. The method according to claim 1, wherein said topology map is stored in a central controller of said wireless network.

8. The method according to claim 1, wherein said topology map is broadcasted in the whole network.

9. The method according to claim 1, wherein only the parts of the topology map related to a specific network device are transmitted to said specific network device.

10. The method according to claim 1, wherein said calibration signal is transmitted using an omni-directional antenna.

11. The method according to claim 1, wherein the contents of the topology map are codes that are mapped to receive power values.

12. The method according to claim 1, wherein said measurement phase and/or reporting phase is initiated by the network device creating said topology map.

13. A network device for a wireless network, wherein said wireless network includes a plurality of network devices, wherein said network devices include mobile network devices provided for direct wireless communication in-between each mobile network device, and wherein a topology map indicating the quality of connectivity of each network device of the wireless network with all other network devices in said wireless network is created, comprising:
   means for broadcasting a calibration signal directly to the other network devices;
   means for measuring a power level of calibration signals received directly from a broadcasting network device;
   means for internally storing results of said measurement;
   means for receiving a reporting control signal transmitted by a network device creating said topology map;
   means for directly wirelessly transmitting said measurement results to another network device; and
   means for receiving at least part of said topology map transmitted from said network device creating said topology map.

14. The network device according to claim 13, wherein said functions are performed on demand of another network device or on an internal demand.

15. The network device according to claim 13, further comprising:

a calibration decoder that initiates the broadcast of a calibration signal and the measurement of the reception quality of one or more incoming calibration signals upon reception of a measurement control signal.

16. The network device according to claim 15, wherein said calibration decoder initiates the transmission of one or more measurement results upon reception of a reporting control signal.

17. The network device according to claim 13, further comprising:
 a report encoder that receives one or more signal quality indication signals and encodes therefrom a signal quality control signal to be transmitted to said other network device.

18. A method to create a topology map of a wireless network including a plurality of network devices, wherein said network devices include mobile network devices provided for direct wireless communication in-between each mobile network device, said topology map indicating the quality of connectivity of each of said plurality of network devices with all other network devices of said plurality of network devices, comprising:
 performing a measurement phase in which a calibration signal is successively broadcasted by each network device and in which all respective other network devices receiving said calibration signal directly from a broadcasting network device measure the received signal quality;
 performing a reporting phase in which a reporting control signal is broadcasted by a network device creating said topology map to each other network device and in which the measurement results are directly transmitted from each network device receiving said reporting control signal to the network device creating said topology map;
 performing a creating phase in which said topology map of the network is created within the network device creating said topology map solely on the basis of all received measurement results; and
 performing a transmission phase in which said network device creating said topology map transmits at least part of said topology map to the other network devices.

19. The method according to claim 18, wherein said calibration signal is transmitted in a dedicated control channel.

20. The method according to claim 18, wherein said measurement results are reported in a respective dedicated control channel.

21. The method according to claim 18, wherein said calibration signal is transmitted with the maximum allowed transmit power level.

22. The method according to claim 18, wherein said topology map is updated when a new network device joins the network.

23. The method according to claim 18, wherein said topology map is updated after a predetermined amount of time.

24. The method according to claim 18, wherein said topology map is stored in a central controller of said wireless network.

25. The method according to claim 18, wherein said topology map is broadcasted in the whole network.

26. The method according to claim 25, wherein said topology map is stored by each network device with an associated time stamp.

27. The method according to claim 18, wherein only the parts of the topology map related to a specific network device are transmitted to said specific network device.

28. The method according to claim 18, wherein said calibration signal is transmitted using an omni-directional antenna.

29. The method according to claim 18, wherein said measurement phase and/or reporting phase is initiated by the network device creating said topology map.

30. A method to create a topology map of a wireless network including a plurality of network devices, wherein said network devices include mobile network devices provided for direct wireless communication in-between each mobile network device, wherein network communication between said plurality of network devices is effected solely as wireless communication and wherein said topology map indicating the quality of connectivity of each of said plurality of network devices with all other network devices of said plurality of network devices, comprising:
 performing a measurement phase in which a calibration signal is successively broadcasted by each network device and in which all respective other network devices receiving said calibration signal directly from a broadcasting network device measure the received signal quality;
 performing a reporting phase in which a reporting control signal is broadcasted by a network device creating said topology map to each other network device and in which the measurement results are directly transmitted from each network device receiving said reporting control signal to the network device creating said topology map;
 performing a creating phase in which said topology map of the network is created within the network device creating said topology map on the basis of all received measurement results; and
 performing a transmission phase in which said network device creating said topology map transmits at least part of said topology map to the other network devices.

* * * * *